(12) United States Patent
Hoyt et al.

(10) Patent No.: US 7,798,023 B1
(45) Date of Patent: Sep. 21, 2010

(54) LINKAGE ASSEMBLY FOR IN-LINE INSPECTION TOOL

(75) Inventors: Philip M. Hoyt, Murray, UT (US); Arthur K. Fox, Murray, UT (US)

(73) Assignee: Electromechanical Technologies, Inc., Murray, UT (US)

( * ) Notice: Subject to any disclaimer, the term of this patent is extended or adjusted under 35 U.S.C. 154(b) by 0 days.

(21) Appl. No.: 12/478,137

(22) Filed: Jun. 4, 2009

Related U.S. Application Data (63) Continuation-in-part of application No. 12/192,030, filed on Aug. 14, 2008, now abandoned.

(60) Provisional application No. 61/065,462, filed on Feb. 11, 2008.

(51) Int. Cl.
*G01M 19/00* (2006.01)
(52) U.S. Cl. .................................... 73/865.8
(58) Field of Classification Search ............... 73/865.8
See application file for complete search history.

(56) References Cited

U.S. PATENT DOCUMENTS

| | | | |
|---|---|---|---|
| 3,786,684 A | 1/1974 | Wiers et al. |
| 3,949,292 A | 4/1976 | Beaver et al. |
| 3,967,194 A | 6/1976 | Beaver et al. |
| 4,006,359 A | 2/1977 | Sullins et al. |
| 4,105,972 A | 8/1978 | Smith |
| 4,447,777 A | 5/1984 | Sharp et al. |
| 4,769,598 A | 9/1988 | Krieg et al. |
| 4,835,876 A | 6/1989 | Petermann et al. |
| 4,852,391 A | 8/1989 | Ruch et al. |
| 4,953,412 A | 9/1990 | Rosenberg et al. |
| 4,964,059 A | 10/1990 | Sugaya et al. |
| 5,293,117 A | 3/1994 | Hwang |
| 5,309,844 A | 5/1994 | Zollinger |
| 5,565,633 A | 10/1996 | Wernicke |
| 5,864,232 A | 1/1999 | Laursen |
| 6,023,986 A | 2/2000 | Smith et al. |

(Continued)

OTHER PUBLICATIONS

BJ Pipeline Inspection Services, Sales Brochure, BJ Process and Pipeline Services, a division of BJ Services Company, Houston, TX, 2003.

(Continued)

*Primary Examiner*—Hezron Williams
*Assistant Examiner*—Alex Devito
(74) *Attorney, Agent, or Firm*—Warren M. Pate, LLC (57) ABSTRACT

An in-line inspection tool comprising sensors mounted on inspection assemblies is disclosed. Each inspection assembly may be connected to the rest of the in-line inspection tool by two linkages. A first linkage may pivotally connect at one end thereof to a first end of an inspection assembly and pivotally connect at the other end thereof to the rest of the in-line inspection assembly. A second linkage may pivotally connect at one end thereof to a second end of the inspection assembly and pivotally connect at the other end thereof to the rest of the in-line inspection tool. The second linkage may comprise a first section and a second section pivotally connected to one another. Accordingly, the first and second linkages may support, exclusively through pivoting, both translational and rotational movement of the inspection assembly within a radial plane containing the central axis of the in-line inspection tool.

9 Claims, 6 Drawing Sheets

U.S. PATENT DOCUMENTS

| | | |
|---|---|---|
| 6,087,830 A | 7/2000 | Brandly et al. |
| 6,232,773 B1 | 5/2001 | Jacobs et al. |
| 6,427,602 B1 | 8/2002 | Hovis et al. |
| 6,450,104 B1 | 9/2002 | Grant et al. |
| 6,538,431 B2 * | 3/2003 | Couchman et al. ...... 15/104.061 |
| 6,640,655 B1 | 11/2003 | Manzak et al. |
| 6,847,207 B1 | 1/2005 | Veach et al. |
| 6,910,533 B2 * | 6/2005 | Guerrero .................... 74/103 |
| 7,256,576 B2 | 8/2007 | Mandziuk et al. |
| 7,334,642 B2 | 2/2008 | Doering et al. |
| 7,548,059 B2 | 6/2009 | Thompson et al. |
| 2001/0017541 A1 | 8/2001 | Kwun et al. |
| 2003/0089267 A1 | 5/2003 | Ghorbel et al. |
| 2006/0248966 A1 | 11/2006 | Houldey et al. |

OTHER PUBLICATIONS

Pipeline Operator Assists in new ILI tool development, Tech Notes: Product Development, Marathon Ashland Pipe Line LLC, Pipeline & Gas Journal, Dec. 1, 2001.

Recent Developements in multi-diameter Inspection Tool Technologies, Kjartan Vartdal and Kjell Traa, PipeCare AS, Stavanger, Norway, The Pipeline Pigging, Integrity Assessment and Repair Conference, Houston, TX, Feb. 5-6, 2003.

* cited by examiner

LINKAGE ASSEMBLY FOR IN-LINE INSPECTION TOOL

RELATED APPLICATIONS

This application is a continuation-in-part of U.S. patent application Ser. No. 12/192,030 filed Aug. 14, 2008 now abandoned, which claims the benefit of U.S. Provisional Patent Application Ser. No. 61/065,462 filed Feb. 11, 2008. U.S. patent application Ser. No. 12/192,030 and U.S. Provisional Patent Application Ser. No. 61/065,462 are hereby incorporated by reference.

FIELD OF THE INVENTION

This invention relates to pipeline inspection tools, and more particularly to apparatus and methods for linking sensors or inspection assemblies to an in-line inspection tool.

BACKGROUND OF THE INVENTION

Oil, petroleum products, natural gas, hazardous liquids, and the like are often transported using pipelines. The majority of these pipelines are constructed from steel pipe. Once installed, a pipeline will inevitably corrode or otherwise degrade. Proper pipeline management requires identification, monitoring, and repair of defects and vulnerabilities of the pipeline. For example, information collected about the condition of a pipeline may be used to determine safe operating pressures, facilitate repair, schedule replacement, and the like.

Typical defects of a pipeline may include corrosion, gouges, dents, and the like. Corrosion may cause pitting or general wall loss, thereby lowering the maximum operating pressure of the pipeline. Vulnerabilities may also include curvature and bending anomalies, which may lead to buckling, and combined stress and chemical or biological action such as stress corrosion cracking. Without detection and pre-emptive action, all such defects and vulnerabilities may lead to pipeline failure.

Information on the condition of a pipeline is often collected using an in-line inspection tool. An in-line inspection tool typically uses sensors to collect information about a pipeline as it travels therethrough. In the past, in-line inspection tools have used magnetic flux leakage to determine the condition of a pipeline wall. Flaws in ferromagnetic pipe can be detected by the perturbations they cause in a magnetic field applied to the wall of a pipeline.

To collect useful data, the sensors carried by an in-line inspection tool must closely track the interior surface of the pipe being inspected. However, the interior surfaces of pipes are not uniform and the sensors must move relative to the central parts of the inspection tool as the tool passes pipe sections with varying interior surfaces. Accordingly, the mechanisms connecting the sensors or inspection assemblies to the rest of the in-line inspection tool must accommodate this relative movement.

Various mechanisms have been designed to connect inspection assemblies to in-line inspection tools. One such design is a linkage fabricated as a parallelogram. In this design, a link at the front of the assembly is parallel to a link at the rear of the assembly, thereby allowing the assembly to move radially relative to the rest of the in-line inspection tool. These linkages are straightforward, but consume significant space as the assembly collapses on top of the rear linkage. Accordingly, they have difficulty in accommodating sharp bends in a pipeline. Furthermore, they must move parallel to their support axis and they can not conform to irregularities such as welds without lifting off from the pipe surface.

Another design is a mechanism that simply does not include a rear linkage, relying alone on a connection at the front of the assembly. These mechanisms cannot precisely control the position of the back end of the assembly. Yet another design uses a rear link mounted in a slot or slide, permitting assembly to move radially relative to the rest of the in-line inspection tool. However, the motion of this last design can be significantly hampered when debris fills the slot or slide.

In view of the foregoing, current linkages prevent rotation of inspection assemblies, allow inspection assemblies to wander away from their designated track, introduce attributes that cause the inspection assemblies to lift away from the pipe, succumb to debris, and the like. What is needed is a new mechanism for connecting inspection assemblies to an in-line inspection tool. This new mechanism must repeatably permit the necessary relative motion, while providing precise control over that motion.

SUMMARY

An in-line inspection tool and associated methods in accordance with the present invention may comprise or utilize various components including a plurality of inspection assemblies. The inspection assemblies may be distributed circumferentially about the tool. Inspection assemblies may move in a radial direction with respect to the main body of an in-line inspection tool and they may be free to rotate in the plane of their support arms or linkages. This freedom of motion may accommodate general and local changes in the pipe being inspected.

For example, general features such as bends, constrictions, and changes in the thickness of the wall of the pipe may all affect the interior diameter of a pipeline. Radial movement of an inspection assembly may permit an inspection assembly to closely track the interior surface of a pipeline in spite of changes in the interior diameter thereof. Local features such as circumferential welds or dents may tend to force an inspection assembly to lift away from the pipe wall. Freedom of rotation may accommodate local features and allow an inspection assembly to closely track the pipeline surface without liftoff.

Linkages may connect an inspection assembly to the rest of an in-line inspection tool. These linkages may hold the inspection assembly in the correct location against the interior surface of the pipeline being inspected and restrict movement of the inspection assembly to a single radial plane (i.e., a plane containing the central axis of the in-line inspection tool). Linkages in accordance with the present invention may support both translational and rotational movement of the inspection assembly within the radial plane. These two degrees of freedom permit the in-line inspection tool to pass bends, changes in diameter, other general pipeline features, circumferential welds, dents, damaged pipe walls and other local pipeline features. Such linkages may also hold an inspection assembly against the interior surface of the pipeline being inspected despite gravitational forces, magnetic forces, and the like that may urge the inspection assembly toward the central axis of the in-line inspection tool.

In certain embodiments, two linkages may connect each inspection assembly to the rest of the in-line inspection tool. For example, a leading linkage may extend from a leading flange or extension formed in a portion of the in-line inspection tool. Similarly, a trailing linkage may extend from a trailing flange or extension formed in a portion of the in-line inspection tool.

In selected embodiments, a leading linkage may include two pivots, while a trailing linkage may comprise three pivots. For example, a leading linkage may comprise a single intermediate section pivotally connected at each end. A trailing linkage, on the other hand, may comprise two pivotally connected intermediate sections. Accordingly, a trailing linkage may provide an additional rotational degree of freedom. In other embodiments, the roles may be reversed and a leading linkage may provide the additional degree of freedom.

By strictly limiting movement of an inspection assembly to movements within a radial plane, leading and trailing linkages may more precisely control the radial spacing between inspection assemblies. This in turn may produce better data on the pipeline being inspected. By supporting rotation of inspection assemblies within the radial plane, leading and trailing linkages may provide close tracking of the interior surfaces of the pipeline being inspected. Moreover, by relying exclusively on pivots and pivoting, and not slots and sliding, leading and trailing linkages in accordance with the present invention function precisely and repeatably, even in very dirty environments.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention as claimed, but is merely representative of various embodiments of the invention. The illustrated embodiments of the invention will be best understood by reference to the drawings, wherein like parts are designated by like numerals throughout.

Figure 1:
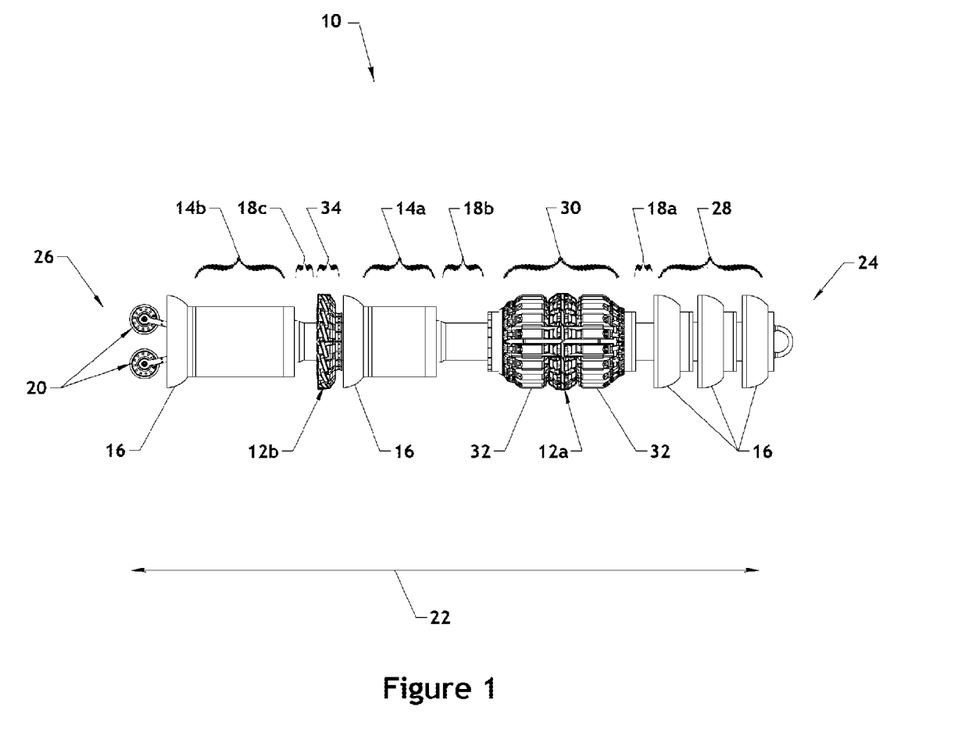
FIG. 1 is an elevation view of one embodiment of an in-line inspection tool in accordance with the present invention.

Referring to FIG. 1, an in-line inspection tool 10 or vehicle 10 in accordance with the present invention may comprise various components including inspection sensors 12, canisters 14, driving cups 16, couplers 18, position sensors 20, and the like. Depending on the configuration of the in-line inspection tool 10 and the size of the pipeline to be inspected, the arrangement and number of components (e.g., the number of canisters 14) may vary.

Canisters 14 may house equipment such as one or more processors, memory devices, and batteries. The driving cups 16 may center the tool 10 within the pipeline and enable fluid traveling within a pipeline to engage the tool 10, thereby pushing the tool 10 through the pipeline. In selected embodiments, driving cups 16 may be formed of a somewhat flexible polyurethane or similar material. Couplers 18 may support bending of the tool 10, enabling the tool 10 to accommodate bends in the pipeline. Like the driving cups 16, in selected embodiments the couplers 18 may be formed of a somewhat flexible polyurethane or similar material or a mechanical pivoting device.

An in-line inspection tool 10 may extend in a longitudinal direction 22 from a head end 24 to a tail end 26. The various components 12, 14, 16, 18, 20 of an in-line inspection tool 10 may be arranged in series. For example, in the illustrated embodiment, the head end 24 of a tool 10 may comprise a head section 28 comprising one or more driving cups 16. Following the head section 28 may be a primary sensor suite 30. In selected embodiments, a primary sensor suite 30 may comprise an array of magnets 32 and sensors 12a. A coupler 18a may extend to connect the head section 28 to the primary sensor suite 30.

Following the primary sensor suite 30 may be a first canister 14a. In one embodiment, the first canister 14a may house the hardware providing the processing and memory storage for the in-line inspection tool 10. A coupler 18b may extend to connect the primary sensor suite 30 to the first canister 14a.

The first canister 14a may be followed by another driving cup 16 and a secondary sensor suite 34. A coupler 18c may engage the second sensor suite 34 and extend rearwardly to engage a second canister 14b. In one embodiment, the second canister 14b may house the batteries providing the power for the in-line inspection tool 10. In selected embodiments, a driving cup 16 may connect to the second canister 14b. One or more position sensors 20 may then engage the second canister 14b, driving cup 16, or some combination thereof to form the tail end 26 of the in-line inspection tool 10. In one embodiment, the position sensors 20 may comprise one or more odometers 20 positioned to roll along the interior surface of the pipeline and measure the distance traveled by the in-line inspection tool 10.

Figure 2:
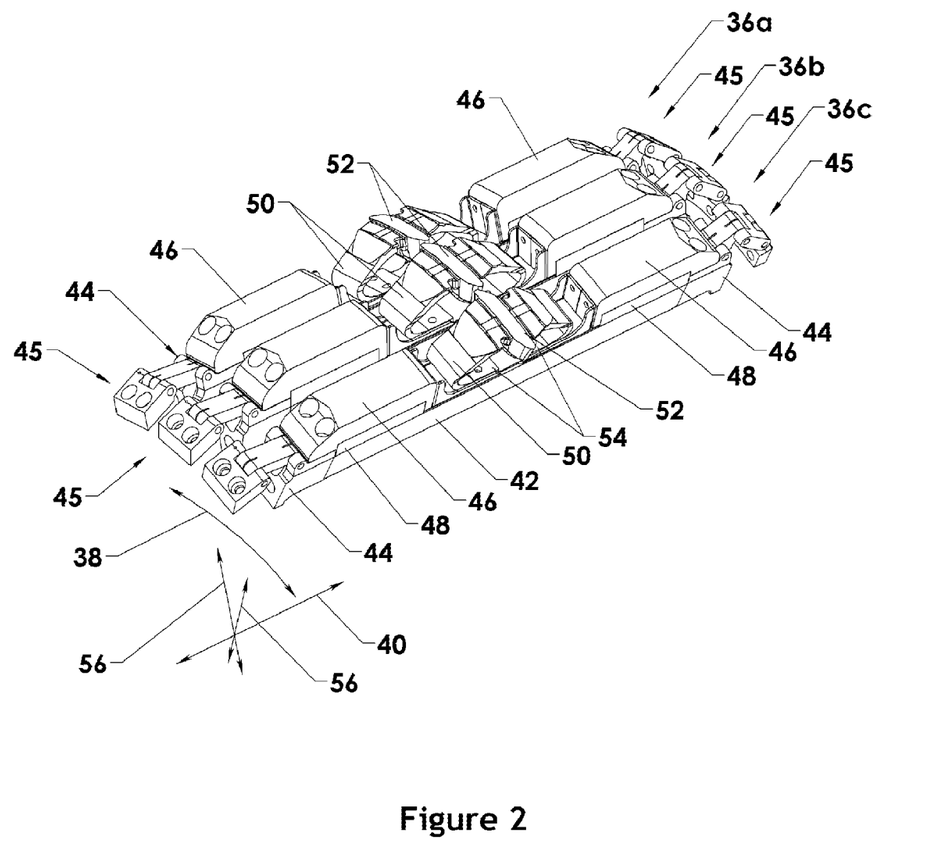
FIG. 2 is a perspective view of selected inspection assemblies and linkages positioned with respect to one another as they would be when installed on an in-line inspection tool in accordance with the present invention.

Referring to FIG. 2, in selected embodiments, a primary sensor suite 30 may include a plurality of inspection assemblies 36 distributed circumferentially (i.e., in a circumferential direction 38) about a central axis 40 of an in-line inspection tool 10. Each inspection assembly 36 may include a back bar 42 for supporting the various components of the inspection assembly 36. A linkage mount 44 may be positioned at each end of a back bar 42. Linkages 45 may engage an inspection assembly 36 via the linkage mounts 44 and extend therefrom to connect the inspection assembly 36 to an interior cylinder (not shown) forming the back bone of the primary sensor suite 30. Accordingly, inspection assemblies 36 may encircle the interior cylinder.

While the present invention may be described herein in the context of a magnetic-flux-leakage in-line inspection tool 10, the present invention may be used in conjunction with other sensing technologies. For example, the present invention may be applied to in-line inspection tools utilizing ultrasonic inspection, eddy current inspection, electro-magnetic acoustic transducer (EMAT) inspection, and the like.

In embodiments utilizing magnetic-flux-leakage inspection, a high level magnetic flux field may be introduced into the wall of a pipe. Anomalies within the wall may cause perturbations in the field. Accordingly, the existence and location of the anomalies may be detected.

In selected embodiments utilizing magnetic-flux-leakage inspection, a back bar 42 may support one or more magnets 48. In certain embodiments, an inspection assembly 36 may include a magnet mount 46 providing an interface between a back bar 42 and a magnet 48. The magnet mount 46 may protect the magnet 48. The magnet mount 46 may also assist in transferring flux into the wall of the pipe being inspected.

In selected embodiments, a back bar 42 may support two magnets 48, one magnet 48 proximate each end thereof. A sensor mount 50 may secure to the back bar 42 at a location between the two magnets 48. The sensor mount 50 may connect a sensor housing 52 to the back bar 42. In certain embodiments, one or more clamps 54 may secure a sensor mount 50 to a back bar 42.

A sensor mount 50 may comprise flexible material. Accordingly, a sensor mount 50 may permit relative motion between a sensor housing 52 and a back bar 42. Constraints such as the magnet mount 46 may be positioned proximate a sensor mount 50 to control or limit certain motion of the sensor mount 50 and sensor housing 52 with respect to the back bar 42. In selected embodiments, a constraint 46 may prevent the sensor housing from contacting or being crushed by the back bar 42. Accordingly, a constraint 46 may provide an additional control over the motion of a sensor housing 52 with respect to a back bar 42. In selected embodiments, sensor housings 52 may be configured and mounted as described in U.S. patent application Ser. No. 12/403,754 filed Mar. 13, 2009, which is hereby incorporated by reference.

Inspection assemblies 36 may move with respect to the interior cylinder or main body of an in-line inspection tool 10. For example, inspection assemblies 36 may move in a radial direction 56 with respect to the rest of an in-line inspection tool 10. This freedom of motion may accommodate changes in the pipe being inspected. For example, features such as bends, constrictions, changes in the thickness of the wall of the pipe, circumferential welds, dents, and damaged pipe walls may all affect the interior diameter of a pipeline. Movement of an inspection assembly 36 may permit sensor housings 52 to closely track the interior surface of a pipeline in spite of changes in the interior diameter thereof.

Figure 3:
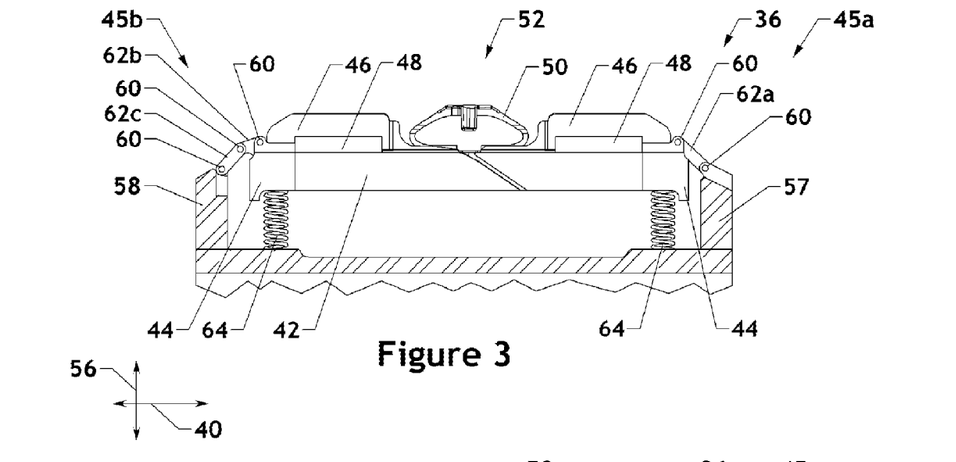
FIG. 3 is a side, partial cut-away view of one embodiment of an inspection assembly connected by linkages to the rest of an in-line inspection tool and occupying a fully extended position in accordance with the present invention.

Referring to FIG. 3, in selected embodiments, linkages 45 connecting an inspection assembly 36 to the rest of an in-line inspection tool 10 may hold the inspection assembly 36 in the correct location against the interior surface of the pipeline being inspected, restrict movement of the inspection assembly 36 to a single radial plane (i.e., a plane containing the central axis 40), and support movement (e.g., translation and rotation) of the assembly 36 within the radial plane to pass bends, changes in diameter, pipeline features, and damaged pipe walls without impeding movement of the in-inspection tool 10. The linkages 45 may hold an inspection assembly 36 against the interior surface of the pipeline being inspected despite gravitational forces, magnetic forces, and the like that may urge the inspection assembly 36 toward the central axis 40 of the in-line inspection tool 10.

In selected embodiments, two linkages 45 may connect each inspection assembly 36 to the rest of the in-line inspection tool 10. For example, a leading linkage 45a may extend from a leading flange 57 or extension 57 formed in a portion of the in-line inspection tool 10. Similarly, a trailing linkage 45b may extend from a trailing flange 58 or extension 58 formed in a portion of the in-line inspection tool 10.

In certain embodiments, a leading linkage 45a may comprise two pivots 60, while a trailing linkage 45b may comprise three pivots 60. For example, in selected embodiments, a leading linkage 45a may comprise a single intermediate section 62a, pivotally connected at each end. A trailing linkage 45b, on the other hand, may comprise two pivotally connected intermediate sections 62b, 62c. Accordingly, a trailing linkage 45b may provide an additional degree of freedom. In other embodiments, the roles may be reversed and a leading linkage 45a may provide the additional degree of freedom.

Contrary to what may be expected in embodiments utilizing magnets 48, the radial positioning of the various inspection assemblies 36 of an in-line inspection tool 10 may not naturally be directly against the interior surface of the pipeline being inspected. The governing physical principle is that the array of inspection assemblies 36 will seek a configuration having the lowest possible potential energy. When magnets 48 are used, minor disturbances such as manufacturing imperfections, weight variations, etc. may cause some inspection assemblies 36 to drop to a lower potential energy position, closer to the central axis 40 of the in-line inspection tool 10.

It is difficult, if not impossible, to predict which inspection assembly 36 or assemblies 36 will drop into a lower energy position (i.e., move toward the central axis 40 of the in-line inspection tool 10). Every magnet 48 has the same magnetism and should, one might think, repel each neighboring magnets 48 with the same outwardly directed force. Inevitably, however, one or more inspection assemblies 36 drop, moving to a position of lower potential energy.

As one or more inspection assemblies 36 move radially inward, the magnetic field is immediately no longer symmetric. As a result, a strong inwardly directed magnetic force is applied to the inspection assemblies 36 that have moved. They can be returned to the outer position only by a force sufficient to overcome the resisting magnetic forces.

Even when inspection assemblies 36 utilizing magnets 48 are held to a pipe wall by magnetic attraction, loss of that attraction can result in some assemblies 36 falling away from the wall of the pipe. These assemblies 36 may return to the wall of the pipe when a sufficient force urges them through a high energy intermediate position and back into contact with the pipe. Contact with the wall of a pipe must be established or reestablished when launching an in-line inspection tool 10, after an in-line inspection tool 36 crosses an opening of a transverse tee fitting, after an encounter with an impediment (e.g., weld line) causing a loss of contact, etc.

An in-line inspection tool 10 in accordance with the present invention may include mechanisms to maintain inspection assemblies 36 in contact with the interior surface of the pipeline being inspected. In selected embodiments, one or more compression springs 64 may urge corresponding inspection assemblies 36 outward in the radial direction 56. For example, in certain embodiments, one or more springs 64 may be positioned between a back bar 42 and an adjacent portion of the in-line inspection tool 10. The springs 64 may have a spring constant selected to provide a force sufficient to overcome the forces, resistance, and instability of a surrounding magnetic field. If desired or necessary, the springs 64 may be preloaded such that there is an immediate and significant resistance to inward deflection of the inspection assemblies 36.

Figure 4:
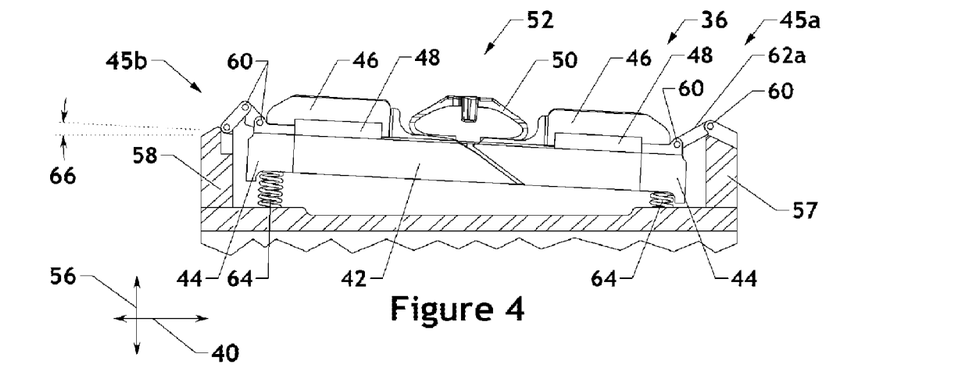
FIG. 4 is a side, partial cut-away view of the inspection assembly and linkages of FIG. 3 with the inspection assembly rotated, in accordance with the present invention, with respect to the central axis of the in-line inspection tool.

Referring to FIG. 4, the leading and trailing linkages 45a, 45b may collectively define and control the range of motion through which an inspection assembly 36 moves with respect to the rest of the in-line inspection tool 10. Linkages 45 may strictly limit movement of an inspection assembly 36 to those within a radial plane (i.e., a plane containing the central axis 40). Accordingly, the radial spacing between sensors housings 52 may be more precisely controlled. This in turn may produce better data on the pipeline being inspected.

Linkages 45 may support translation of inspection assemblies 36 in the radial direction 56 away from and toward the central axis 40 of the in-line inspection tool 10. This variability in the positioning of the inspection assemblies 36 may permit sensor housing 52 to closely track the interior surfaces of pipelines across changes in the inner diameter of the pipeline, bends, seams, imperfections, and the like.

Linkages 45 may also support rotation of inspection assemblies 36. That is, linkages 45 may support a range of motion where one end of an inspection assembly 36 is closer to the central axis 40 than the other end. Thus, an inspection assembly 36 may be positioned at an angle 66 with respect to the central axis 40 of the in-line inspection tool 10. This rotational degree of freedom permits inspection assemblies 36 to closely track the interior surfaces of pipelines without pulling magnets 48 orthogonally away from the wall of the pipe.

Figure 5:
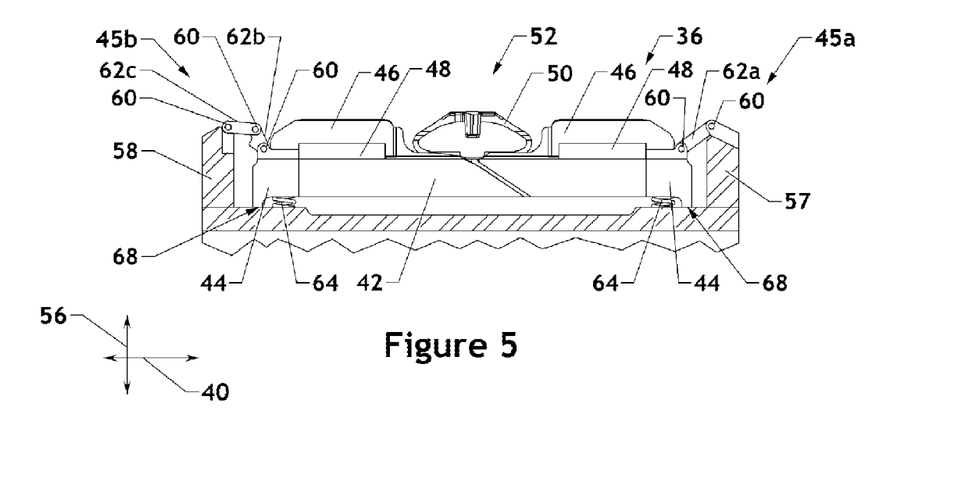
FIG. 5 is a side, partial cut-away view of the inspection assembly and linkages of FIG. 3 with the inspection assembly occupying a fully retracted position in accordance with the present invention.

Referring to FIG. 5, in selected embodiments, a portion of an in-line inspection tool 10 may define the innermost limit to the range of motion of an inspection assembly 36. In one embodiment, the linkage mounts 44 forming the opposite ends of an inspection assembly 36 may include one or more extensions 68 or feet 68. In a fully retracted position, the feet 68 may contact another portion of the in-line inspection tool 10, thereby resisting further inward deflection of the inspection assembly 36. In certain embodiments, the feet 68 may extend a distance sufficient to protect one or more springs 64 from excessive compression.

In selected embodiments, as an inspection assembly 36 deflects from an extended position to a retracted position, the pivot 60 between the two intermediate sections 62b, 62c of a trailing linkage 45b may move in a radial direction 56 away from the central axis 40 of an in-line inspection tool 10. Accordingly, the trailing linkage 45b may fold up and out of the way of the inspection assembly 36. So positioned, the pivot 60 is spaced from both the wall of the pipeline being inspected and the rest of the in-line inspection tool 10. Thus, the pivot 60 may function without collecting debris that may impair or restrict its full range of motion.

Figure 6:
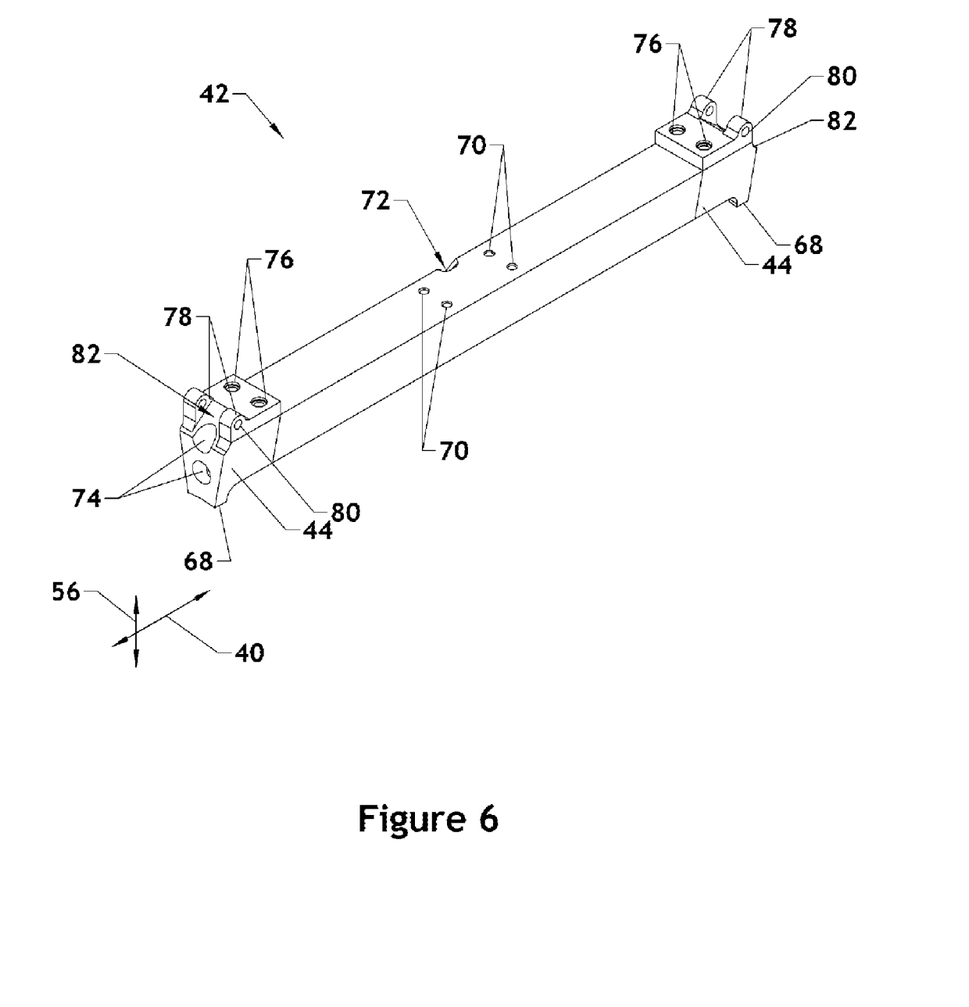
FIG. 6 is a perspective view of one embodiment of a back bar connected to linkage mounts in accordance with the present invention.

Referring to FIG. 6, a back bar 42 in accordance with the present invention may include one or more apertures 70 to receive fasteners for securing the various components (e.g., magnet mounts 46, sensor mounts 50, etc.) to be supported by the back bar 42. In selected embodiments, a back bar 42 may include one or more apertures 72 forming voids into which components (e.g., cabling for sensor heads 52) of inspection assemblies 36 may extend in certain positions or arrangements. A back bar 42 may be formed of non-magnetic, minimally magnetic or magnetically permeable material. For example, in selected embodiments a back bar 42 may be fabricated from magnetically permeable material so that it may function as an armature when the inspection assembly produces and measures a magnetic field.

In selected embodiments, a linkage mount 44 may be secured to each end of a back bar 42. Each linkage mount 44 may include one or more apertures 74 to receive fasteners for securing the mount 44 to the back bar 42. If desired or necessary, each linkage mount 44 may also include one or more apertures 76 to receive fasteners for securing various components (e.g., magnet mounts 46, etc.). Accordingly, linkage mounts 44 may serve as intermediate structural connections between a back bar 42 and certain components supported by the back bar 42.

Linkage mounts 44 may provide the structure through which linkages 45 may secure or engage a back bar 42. In selected embodiments, a linkage mount 44 may include one or more extensions 78 penetrated by pivot apertures 80. These extensions 78 and pivot apertures 80 may support a pivotable engagement with the particular link section 62 adjacent thereto. In certain embodiments, a linkage mount 44 may include a surface 82 defining a boundary to the movement of a link section 62 pivotally connected to the link mount 44. Accordingly, a linkage mount 44 may act in conjunction with a linkage 45 to control the range of motion of an inspection assembly 36 with respect to the rest of the in-line inspection tool 10.

Figure 7:
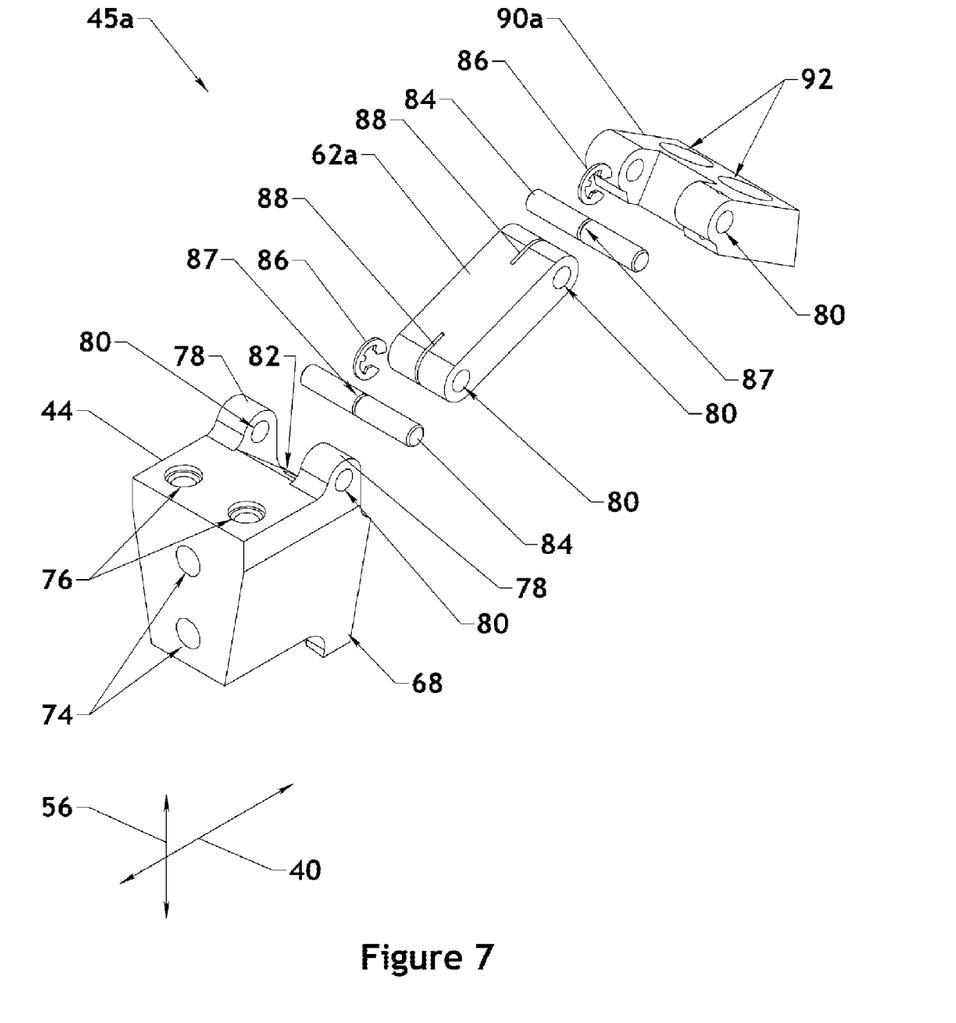
FIG. 7 is an exploded perspective view of one embodiment of a linkage mount, linkage (e.g., leading linkage), and interface in accordance with the present invention.

Referring to FIG. 7, pivots 60 in accordance with the present invention may comprise any suitable mechanism to provide the desired range of motion, manufacturability, and the like. In selected embodiments, a pivot 60 may be formed by aligning pivot apertures 80 in adjacent components (e.g., link sections 62, linkage mounts 44, etc.) and inserting a pin 84 or dowel 84 into the aligned pivot apertures 80. Such pins 84 may be held in place in any suitable manner.

In certain embodiments, pins 84 may be held in place by one or more snap rings 86 engaging corresponding grooves 87 formed in the pin 84. For example, snap rings 86 may engage grooves 87 positioned proximate each end of a pin 84. Alternatively, a pin 84 may include a head at one end and be held in place by a snap ring 86 engaging a groove 87 positioned proximate the other end. In still other embodiments, a pin 84 may be held in place by a single snap ring. In such embodiments, a groove 87 formed in the pin 86 may align with a slot 88 formed in one of the components (e.g., link sections 62, linkage mount 44, etc.) secured by the pin 86.

In selected embodiments, linkages 45 in accordance with the present invention may include link sections 62 that engage interfaces 90 extending from the rest of the in-line inspection tool 10. For example, a leading linkage 45a may comprise a single intermediate section 62a extending to engage an interface 90a. The intermediate section 62a may pivotally engage a linkage mount 44 at one end and pivotally engage the interface 90a at the other end. An interface 90 in accordance with the present invention may secure to the rest of the in-line inspection tool 10, thereby connecting an inspection assembly 36 thereto. In certain embodiments, an interface 90 may include one or more apertures 92 to receive fasteners for securing the interface 90 to a flange 57 or other feature 57 of the in-line inspection tool 10.

Figure 8:
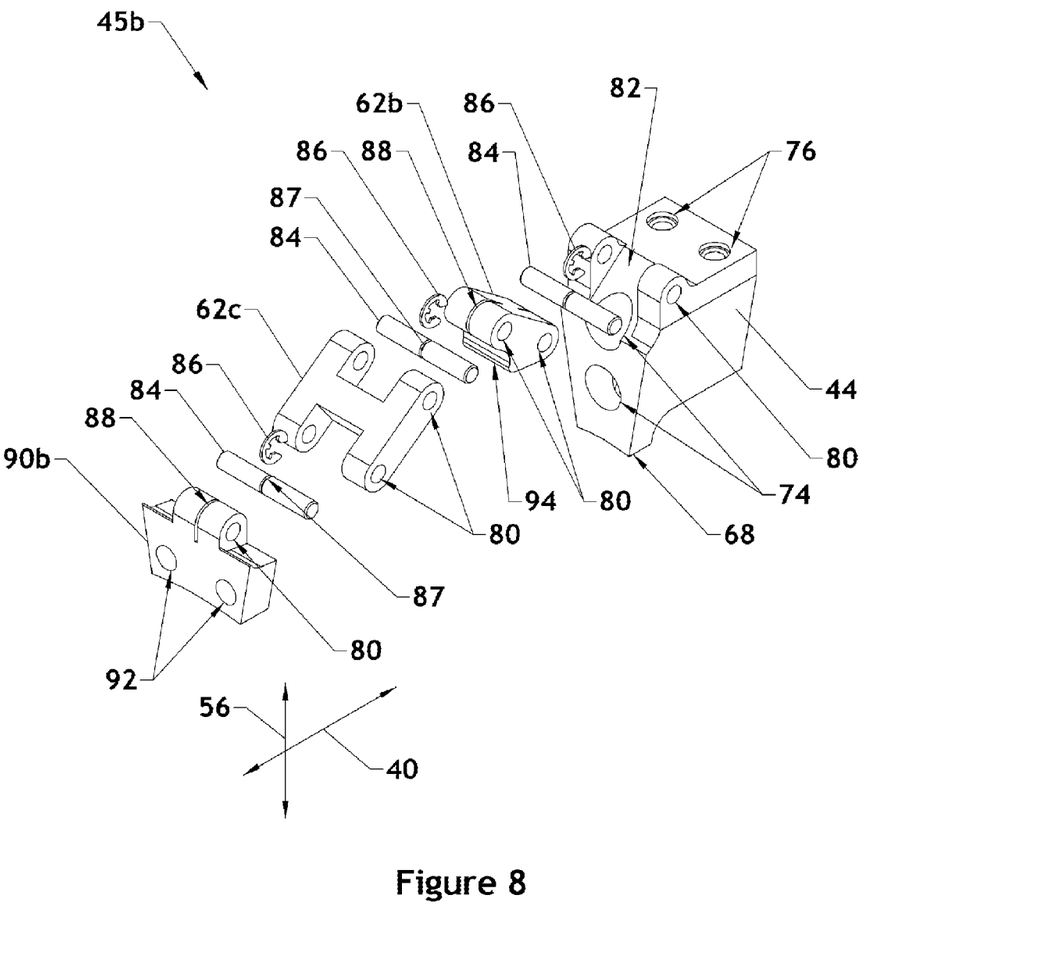
FIG. 8 is an exploded perspective view of another embodiment of a linkage mount, linkage (e.g., trailing linkage), and interface in accordance with the present invention.

Referring to FIG. 8, a linkage 45 in accordance with the present invention may include multiple intermediate sections 62. For example, in selected embodiments, a trailing linkage 45b may include two intermediate sections 62b, 62c. A first intermediate section 62b may pivotally engage a linkage mount 44 at one end and pivotally engage a second intermediate section 62c at the other end. The second intermediate section 62c may, in turn, pivotally engage the first intermediate section 62b at one end and pivotally engage an interface 90b at the other end.

A link section 62 may be shaped to control or limit the range of motion of a linkage 45. For example, in selected embodiments, a first intermediate section 62b of a trailing linkage 45b may be formed with an extension 94. The extension 94 may be sized and shaped to contact the second intermediate section 62c to limit rearward movement of an inspection assembly 36 with respect to the rest of an in-line inspection tool 10. The extension may also be sized and shaped to contact a surface 82 of a linkage mount 44 to limit outward, radial movement of the inspection assembly 36.

Select components (e.g., back bars 42, linkage mounts 44, linkages 45, etc.) may be formed of non-magnetic, minimally magnetic, or magnetically permeable materials. For example, certain components may be formed of non-magnetic stainless steel. This may preclude or limit the undesirable interference of such components with the magnetic field induced in the wall of the pipe being inspected.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An in-line inspection tool for inspecting a pipeline while traveling therethrough, the in-line inspection tool comprising:
    at least one inspection assembly comprising
        a first end,
        a second end opposite the first end,
        at least one sensor,
        a bar supporting the at least one sensor,
        a first linkage mount connected to the bar proximate the first end of the at least one inspection assembly, and
        a second linkage mount connected to the bar proximate the second end of the at least one inspection assembly;
    a structure comprising a central axis;
    a first linkage pivotally connecting at one portion thereof to the first linkage mount and pivotally connecting at another portion thereof to the structure;
    a second linkage pivotally connecting at one portion thereof to the second linkage mount and pivotally connecting at another portion thereof to a third linkage; and
    the third linkage pivotally connecting at one portion thereof to the second linkage and pivotally connecting at another portion thereof to the structure, the third linkage having no fixed connection to the structure.

2. The in-line inspection tool of claim 1, further comprising a biasing member positioned between the structure and the bar of the at least one inspection assembly.

3. The in-line inspection tool of claim 2, wherein the biasing member urges the at least one inspection assembly radially away from the central axis.

4. The in-line inspection tool of claim 1, wherein the first linkage is substantially rigid from the one portion thereof to the another portion thereof.

5. The in-line inspection tool of claim 1, wherein the second linkage is substantially rigid from the one portion thereof to the another portion thereof.

6. The in-line inspection tool of claim 1, wherein the third linkage is substantially rigid from the one portion thereof to the another portion thereof.

7. The in-line inspection tool of claim 1, wherein:
    the first linkage is substantially rigid from the one portion thereof to the another portion thereof;
    the second linkage is substantially rigid from the one portion thereof to the another portion thereof; and
    the third linkage is substantially rigid from the one portion thereof to the another portion thereof.

8. The in-line inspection tool of claim 1, wherein the first linkage is a leading linkage and the second and third linkages are trailing linkages.

9. An in-line inspection tool for inspecting a pipeline while traveling therethrough, the in-line inspection tool comprising:
    a plurality of inspection assemblies, each comprising
        a first end,
        a second end opposite the first end,
        at least one sensor,
        a back bar supporting the at least one sensor,
        a first linkage mount connected to the back bar proximate the first end, and
        a second linkage mount connected to the back bar proximate the second end;
    a structure comprising a central axis;
    the plurality of inspection assemblies being distributed circumferentially about the central axis;
    a first linkage pivotally connecting at one end thereof to the first linkage mount of an inspection assembly of the plurality of inspection assemblies and pivotally connecting at the other end thereof to the structure;
    a second linkage pivotally connecting at one end thereof to the second linkage mount of the inspection assembly and pivotally connecting at the other end thereof to a third linkage; and
    the third linkage pivotally connecting at one end thereof to the second linkage and pivotally connecting at the other end thereof to the structure, the third linkage having no fixed connection to the structure.

* * * * *